M. E. JACOBS.
Tire-Tighteners.
No. 142,633.                           Patented September 9, 1873.
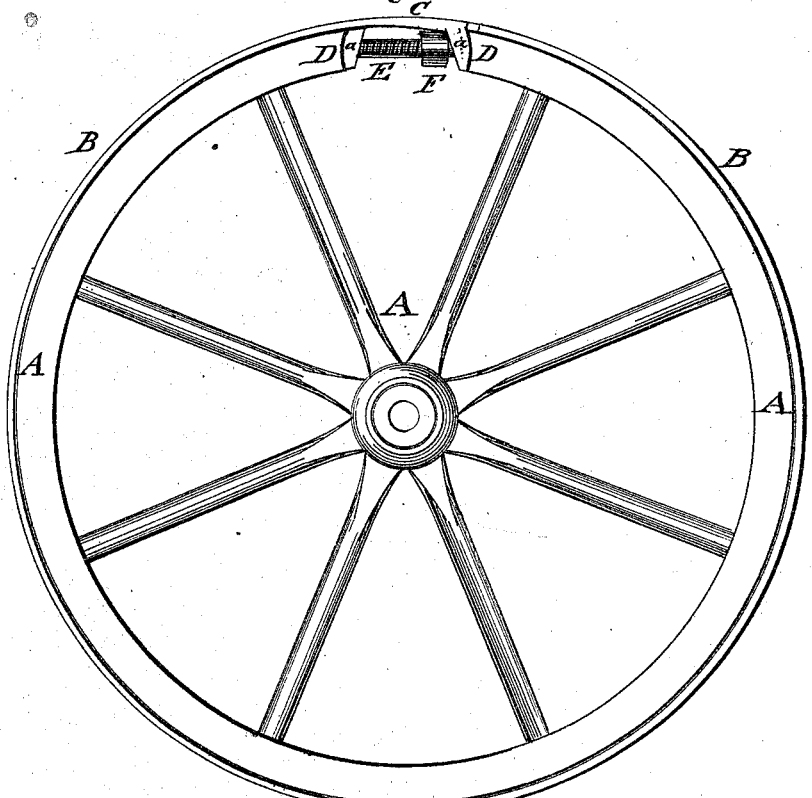
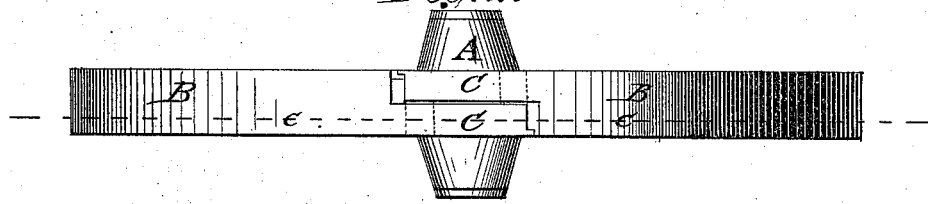
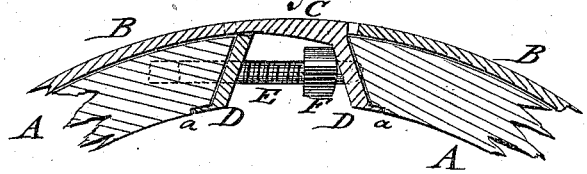
Witnesses:                                      Inventor,
Per
Attorneys,

UNITED STATES PATENT OFFICE.

MILO E. JACOBS, OF WINNEBAGO, ILLINOIS.

IMPROVEMENT IN TIRE-TIGHTENERS.

Specification forming part of Letters Patent No. 142,633, dated September 9, 1873; application filed May 24, 1873.

*To all whom it may concern:*

Be it known that I, MILO E. JACOBS, of Winnebago, in the county of Winnebago and State of Illinois, have invented a new and Improved Tire-Tightener, of which the following is a specification:

In the accompanying drawing, Figure 1 represents a side view of a wheel with my tire-tightener attached. Fig. 2 is a top view of the same; and Fig. 3 is a detail vertical view of the tightener on the line *c c*, Fig. 2.

Similar letters of reference indicate corresponding parts.

The object of my invention is to provide a simple and convenient device for tightening tires, when cold, around the wheel without removing them, so that the same are fully protected and strengthened when in use. My invention consists of a tire with two ends, so constructed that they are recessed to pass beside each other, and rest with face-plates toward the fellies, to be tightened by means of a screw-bolt passing through them.

In the drawing, A represents the wheel; B, the tire placed around the same. The adjoining ends of two fellies are slightly shortened, that the tire ends C may be placed against them. Each tire end C is recessed to half the width of the tire B, and gradually increased to double the thickness of the same, so that both ends may pass alongside of each other, forming the width of tire B, and making up by thickness the strength lost in width. Each tire end C is further provided with a face-plate, D, which extends toward the inside of the wheel, and fits the felly end. The face-plate D has projecting side and lower lips *a*, which clasp the felly end. Plate D extends under tire end C and supports the same. A screw-bolt, E, with a stationary head, F, passes below the tire ends C, through both face-plates D, into recesses of the fellies, so that on turning forward the tire B is loosened; on turning backward tightened. The distance between the face-plates D is thereby increased, which brings the ends C nearer to each other, shortening and tightening thereby the tire B around the wheel A.

Whenever the tire gets loose, a few turns of the screw E will tighten it again on the wheel, so that the tire may be tightened without taking off the wheel. The bolt E operates also as a dowel to both ends of the felly.

Having thus described my invention, I claim as new and desire to secure by Letters Patent—

A tire having its ends halved, and provided with inwardly-projecting flanges or face-plates D, whereby it is adapted to be applied to a divided felly and adjusted by a screw, E F, as and for the purpose specified.

MILO E. JACOBS.

Witnesses:
J. T. BINGHAM,
D. C. LEWIS.